US007266218B2

(12) United States Patent
Call et al.

(10) Patent No.: US 7,266,218 B2
(45) Date of Patent: Sep. 4, 2007

(54) METHOD AND SYSTEM FOR PROVIDING A MEASURE OF PERFORMANCE OF REGION OF INTEREST IDENTIFICATION ALGORITHMS

(75) Inventors: Charles Call, Owego, NY (US); Robert S. Lunt, IV, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 869 days.

(21) Appl. No.: 10/435,725

(22) Filed: May 8, 2003

(65) Prior Publication Data

US 2004/0223628 A1 Nov. 11, 2004

(51) Int. Cl.
*G06K 9/00* (2006.01)
(52) U.S. Cl. ...................... 382/101; 382/282
(58) Field of Classification Search .............. 382/101, 382/290, 282, 283, 156–158, 102; 209/584
See application file for complete search history.

(56) References Cited

U.S. PATENT DOCUMENTS

| | | | | |
|---|---|---|---|---|
| 3,816,726 | A | 6/1974 | Sutherland et al. | 235/152 |
| 5,367,580 | A | 11/1994 | Kumagai | 382/46 |
| 5,455,897 | A * | 10/1995 | Nicholl et al. | 345/627 |
| 5,465,308 | A * | 11/1995 | Hutcheson et al. | 382/159 |
| 5,490,225 | A | 2/1996 | Kumagai | 382/227 |
| 5,499,326 | A * | 3/1996 | Narayanaswami | 345/619 |
| 6,014,450 | A | 1/2000 | Heilper et al. | 382/101 |
| 2001/0021261 | A1 * | 9/2001 | Koga et al. | 382/101 |
| 2002/0106107 | A1 * | 8/2002 | MacDonald | 382/101 |
| 2003/0215113 | A1 * | 11/2003 | Yoder | 382/101 |

OTHER PUBLICATIONS

Polygon Clipping Background Theory [online], [retrieved on Apr. 7, 1998].☐☐Retrieved from the Internet <http://www.cs.rit.edu/~icss571/clipTrans/PolyClipBack.html>.*
Liang, Y. et al. (Nov. 1983) "An Analysis and Algorithm for Polygon Clipping." Communications of the ACM, 26(11), 868-877.
Rogers, S. K. et al. (1991). An Introduction to Biological and Artificial Neural Networks for Pattern Recognition (vol. TT4, p. 100). Bellingham, WA: SPIE.
Vatti, B. R. (Jul. 1992) "A Generic Solution to Polygon Clipping." Communications of the ACM, 35(7), 57-63.

(Continued)

*Primary Examiner*—Joseph Mancuso
*Assistant Examiner*—Claire Wang
(74) *Attorney, Agent, or Firm*—Burns & Levinson LLP; Jacob N. Erlich; Orlando Lopez (57) ABSTRACT

A method and system provide measures of the performance of a region of interest identification algorithm. The method includes obtaining known region of interest data for an object. A candidate region of interest for that object is identified using the region of interest identification algorithm to be evaluated. Candidate region of interest data is then obtained. The known region of interest is superimposed on the candidate region of interest. The area of the overlap between the known region of interest and the candidate region of interest is determined. Finally, a measure of performance based on the area overlap is obtained. The method is implemented in a system including one or more processors and or memories.

21 Claims, 5 Drawing Sheets

OTHER PUBLICATIONS

Schutte, K. (1995) "An Edge Labeling Approach to Concave Polygon Clipping." ACM Transactions on Graphics. URL=citeseer.nj.nec.com/480676.html.

Rasheed, K. et al. (1997). "Using Case-Based Learning to Improve Genetic-Algorithm-Based Design Optimization." Proc. of the 7th Int'l Conf. on Genetic Algorithms (ICGA97). San Francisco: Morgan Kaufman. URL=citeseer.nj.nec.com/73094.html.

Wolf, M. et al. (Aug. 1997). "Fast Address Block Location on Handwritten and Machine Printed Mail-Piece Images." Proc. of the 4th Int'l Conf. on Document Analysis and Recognition, 2, 753-757.

Palumbo, P.W. et al. (Jul. 1992). "Postal Address Block Location in Real Time." Computer, 25(7), 34-42.

Shoaff, W. (1999). "Clipping." Retrieved from http://www.cs.fit.edu/wds/classes/graphics/clip/clip.html on Aug. 21, 2002.

* cited by examiner

METHOD AND SYSTEM FOR PROVIDING A MEASURE OF PERFORMANCE OF REGION OF INTEREST IDENTIFICATION ALGORITHMS

BACKGROUND OF THE INVENTION

This invention relates generally to pattern recognition, and, more particularly to measuring the performance of region of interest (ROI) identification algorithms.

Due to the ever increasing volume of postal items and packages being delivered, postal services and delivery services are increasingly relying on optical character recognition to recognize the addresses of the items to be delivered. In order to effectively recognize the addresses of items to be delivered, it is necessary to identify where the address information is located on the postal item. The first step in that identification is the identification of a region of interest or an area of interest which can be examined in order to determine whether the area or region is an address block.

A variety of algorithms have been utilized to identify a region of interest in an item to be delivered, such as a mail piece. Neural network algorithms have been disclosed as algorithms to identify a region of interest (see for example, the algorithm for generating address block candidates described in U.S. Pat. No. 6,014,450). If a neural network algorithm is used for region of interest identification, it is necessary to train the network. The network "learns" during training by comparing the output to a known output and adjusting the weights to reduce the error (see for example, S. K. Rogers, M. Kabrisky, An Introduction to Biological and Artificial Neural Networks for Pattern Recognition, SPIE, Bellingham, Wash., 1991, p.100). Thus, a measure of the error in identifying a region of interest is desired when a neural network algorithm is utilized.

A genetic algorithm could also be used for region of interest identification. In the development of a genetic algorithm, it is sometimes useful to utilize case based learning (see, for example, K. Rasheed, H. Hirsh, "Using Case Based Learning to Improve Genetic Algorithm Based Design Optimization", Proceedings of the Seventh International Conference on Genetic Algorithms (ICGA97), Morgan Kaufmann, San Francisco, Calif., 1997, url="citeseer.nj.nec.com/73094.html".) A number of known designs and a measure of the fitness of the solution obtained by the genetic algorithm are needed.

Even further, when algorithms such as the algorithm for detecting Areas of Interest (AOI) found in M. Wolf et al., "Fast Address Block Location in Handwritten and Printed Mail-piece Images", Proc. Of the Fourth Intl. Conf. on Document Analysis and Recognition, vol.2, pp.753-757, Aug. 18-20, 1997, or the segmentation methods defined in P. W. Palumbo et al., "Postal Address Block Location in Real time", Computer, Vol. 25, No. 7, pp. 34-42, July 1992, are utilized, a measure of the performance of the algorithm allows the comparison of two or more algorithms. Thus, there is a need for a method and system for measuring the performance of region of interest identification algorithms.

BRIEF SUMMARY OF THE INVENTION

A method and system for measuring the performance of a region of interest identification algorithm are disclosed.

The first step in the method of this invention comprises obtaining known region of interest data for an object. A candidate region of interest for that object is identified using the region of interest identification algorithm to be evaluated. Candidate region of interest data is then obtained. The known region of interest is superimposed on the candidate region of interest. The area of the overlap between the known region of interest and the candidate region of interest is determined. Finally, a figure of merit (FOM) based on the area overlap is obtained.

The system of this invention includes means for obtaining known region of interest data, means for obtaining candidate region of interest data from a candidate region of interest identified using the region of interest identification algorithm, one or more memories having computer readable code with instructions for executing the remainder of the steps of the method of this invention (from the third step forward), and one or more processors that execute the computer readable code.

For a better understanding of the present invention, reference is made to the accompanying drawings and detailed description and its scope will be pointed out in the appended claims.

DETAILED DESCRIPTION OF THE INVENTION

A method and system for measuring the performance of a region of interest identification algorithm are disclosed. The measure of performance of the region of interest identification algorithm being analyzed or developed is based on a given object. In one embodiment, the given object is analyzed by trained observers and known regions of interest (also referred to as reference regions of interest) are obtained from the analysis by the trained observers. It should be noted that other embodiments for obtaining known regions of interest are possible, for example, the use of an algorithm of known extreme accuracy. In a particular embodiment in which the object is a mail piece and the region of interest is an address block, the candidate address block is obtained by the address block identification algorithm being analyzed or developed. The mail piece is, then, analyzed by trained observers and a known address block is obtained by the trained observers. A relationship, as given by this invention, between the candidate address block and the known Address block provides a quantitative measure of performance.

Figure 1:
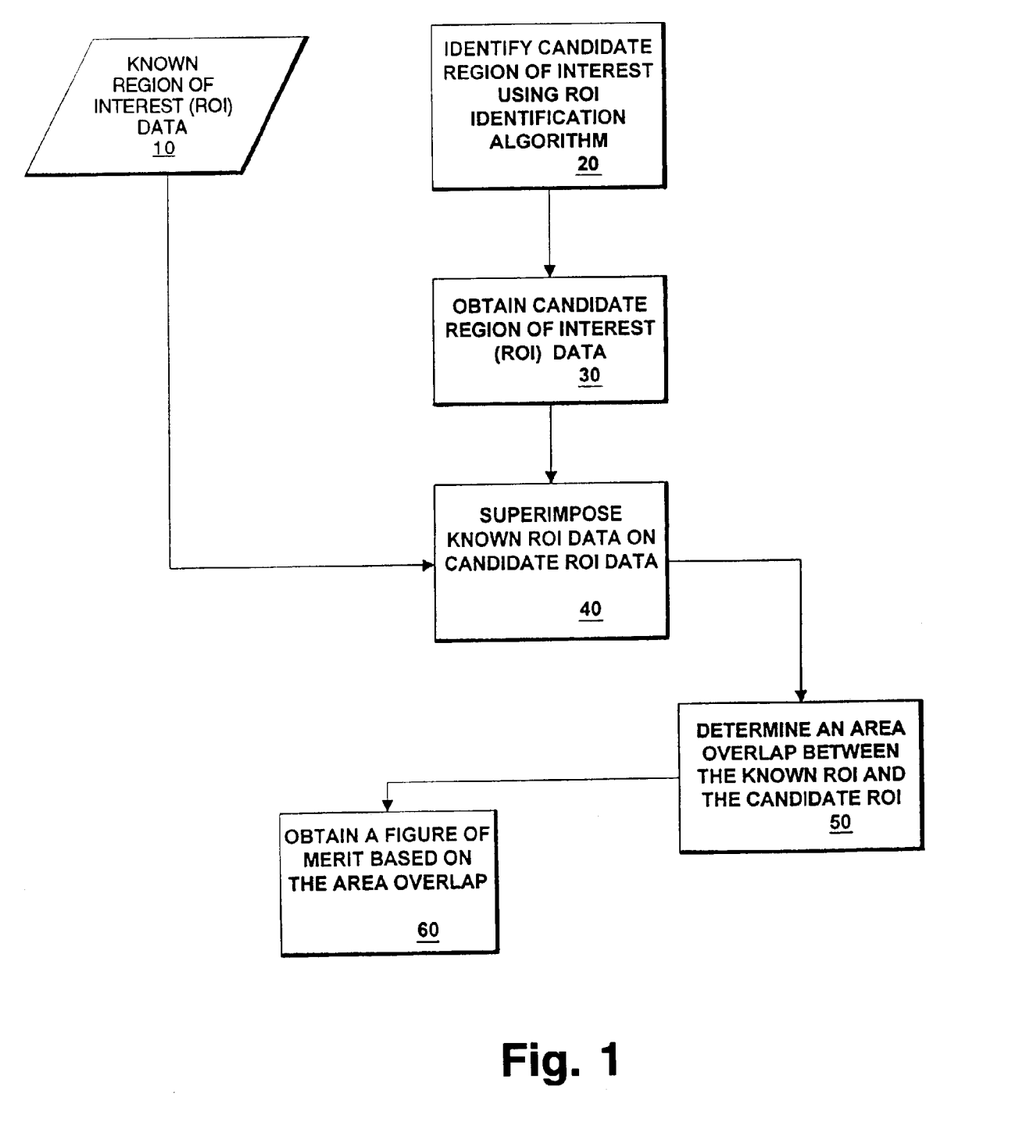
FIG. 1 is flowchart of an embodiment of the method of this invention.

A flow chart representative of an embodiment of the method of this invention is shown in FIG. 1. Referring to FIG. 1, once the known regions of interest (also referred to as reference regions) are obtained for a given object, using, for example but not limited to, the methods disclosed hereinabove, the data, coordinates and other characteristic data, for the known regions of interest is obtained (step 10). Then, the region of interest identification algorithm being analyzed or developed is utilized to identify candidate regions of interest (step 20) and the data for the candidate regions of interest is obtained (step 30). The known region of interest is superimposed on the candidate region of interest (step 40). The area of the overlap between the known region of interest and the candidate Region of interest is determined (step 50). Finally, a figure of merit for the region of interest identification algorithm, based on the area overlap is obtained (step 60).

Figure 2:
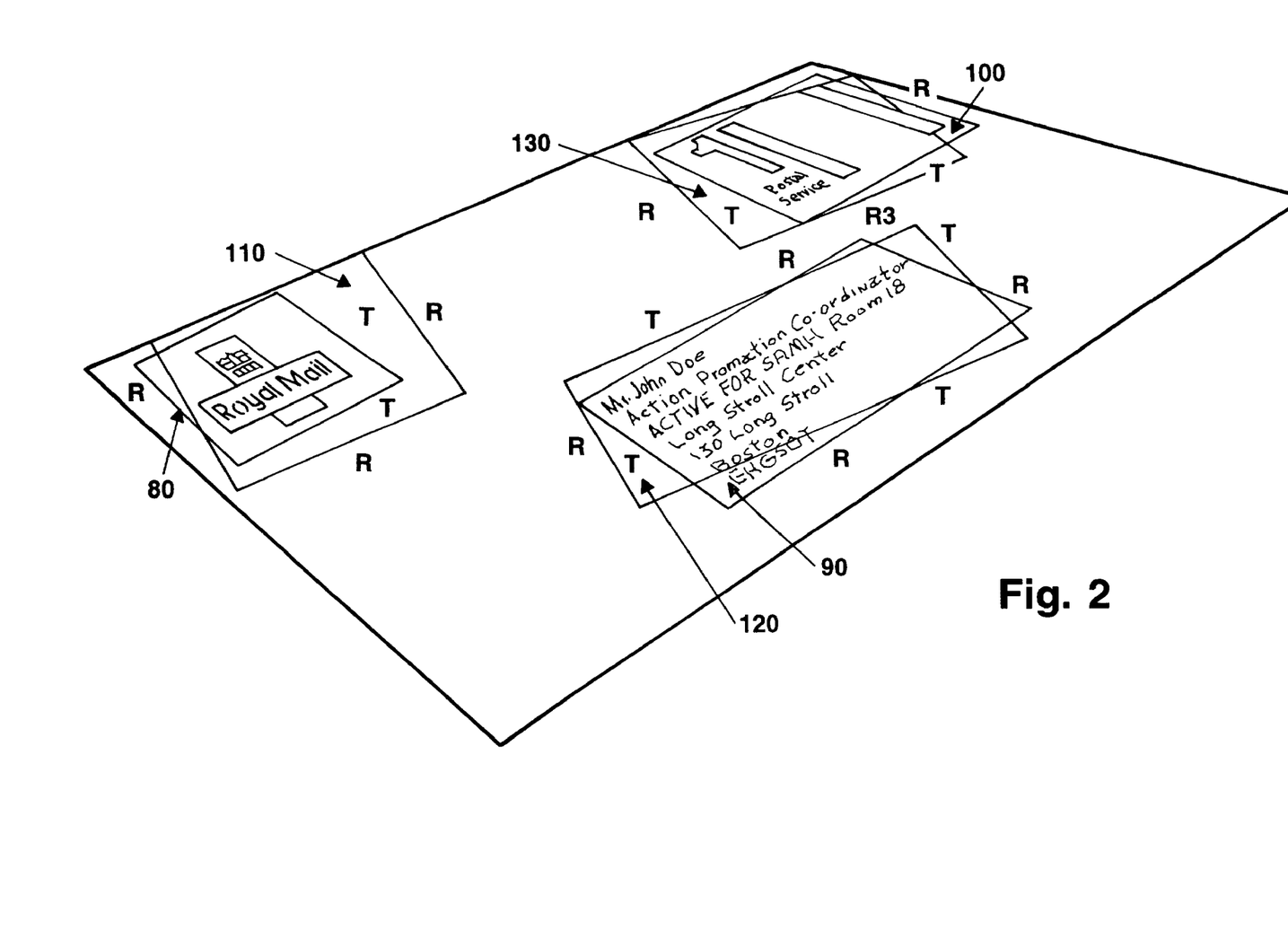
FIG. 2 is a schematic pictorial representation of an object to which the method of this invention is applied.
Figure 3:
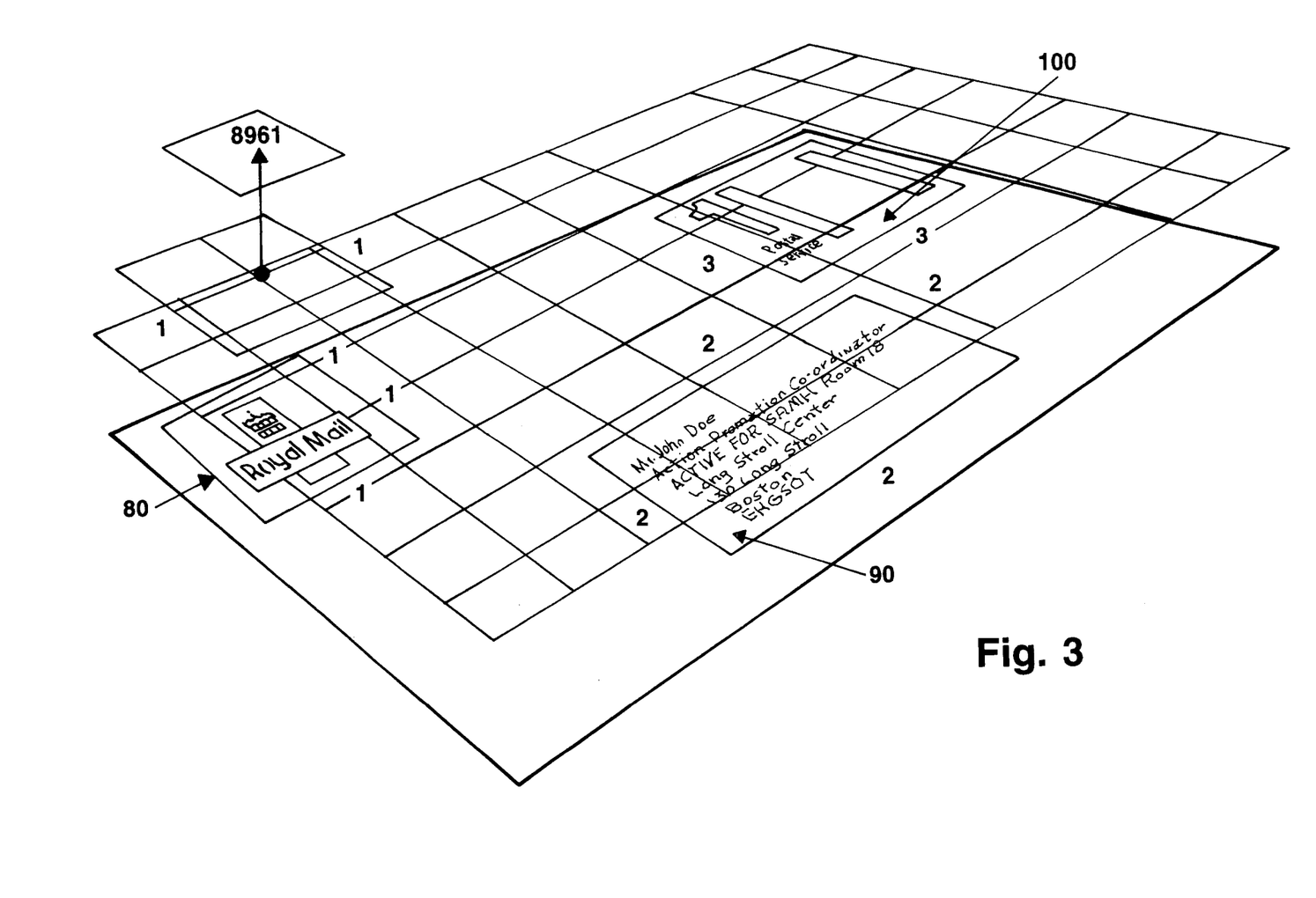
FIG. 3 is another schematic pictorial representation of the object to which the method of this invention is applied.

For the particular embodiment in which, for example, the given object is a mail piece 70, shown in FIG. 2, known regions of interest 80, 90, 100 (labeled T1, T2, and T3, respectively) are obtained by either analysis by trained observers or by use of a known algorithm of known extreme accuracy. Known region of interest T2 90 corresponds to the address block. Applying the region of interest identification algorithm being analyzed or developed, candidate regions of interest 110, 120, 130 (labeled R1, R2, R3 respectively) are identified. The coordinate data for the known regions of interest 80, 90, 100 and for the candidate regions of interest 110, 120, 130 from a coordinate grid referenced to the mail piece 70 as shown in FIG. 3. The known regions of interest 80, 90, 100 are superimposed on the candidate regions of interest 110, 120, 130. The determination of the area of the overlap between the known region of interest and the candidate region of interest, for an arbitrary orientation of the two regions is performed by a polygon clipping type algorithm as in computer graphics.

Figure 4:
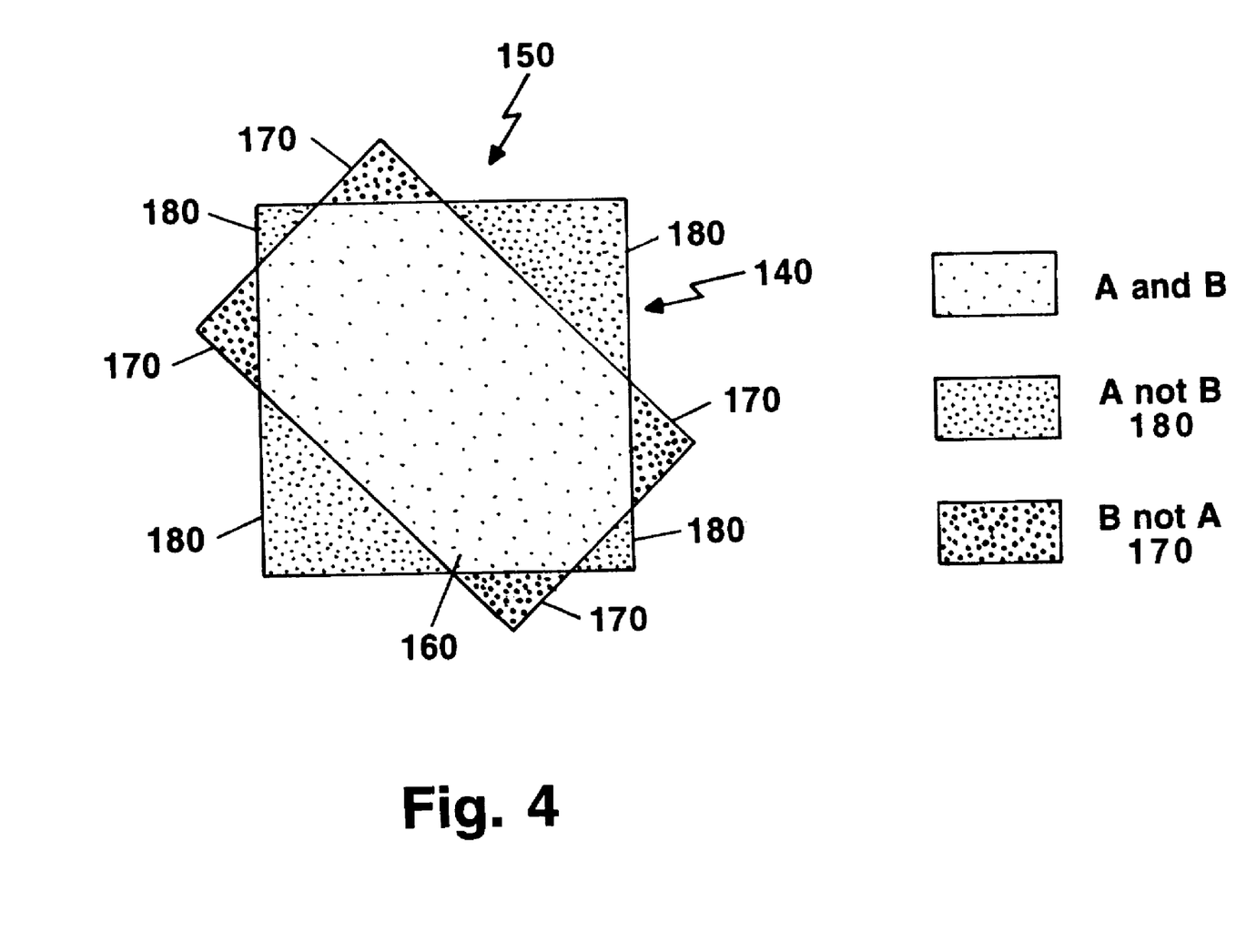
FIG. 4 is schematic pictorial representation of the superimposing of two regions of interest.

FIG. 4 is schematic pictorial representation of the superimposing of the two regions of interest. Known region of interest 140 is the "clipper" polygon and candidate region of interest 150 is the subject polygon (the polygon to be clipped). Area 160 is the clipped area (also referred to herein as the overlap area). Areas 170 are obtained from the area of candidate region of interest 150 by subtracting the clipped area 160. Areas 180 are obtained from the area of known region of interest 140 by subtracting the clipped area 160. Algorithms for polygon clipping have been developed by Weiler and Atherton (the Weiler-Atherton algorithm), Hodgman and Sutherland (the Sutherland-Hodgman algorithm), Liang and Barsky (the Liang-Barsky algorithm), Vatti, Schutte and others. (See "Clipping", W. Shoaff, http://www.cs.fit.edu/wds/classes/graphics/clip/clip.html for a description of the Weiler-Atherton algorithm and the Sutherland-Hodgman algorithm; See also Liang, Y., and Barsky, B. A., *"An analysis and algorithm for polygon clipping,"* Comm. of the ACM, 26(3):868-877, 1983 for the Liang-Barsky algorithm, Bala R. Vatti, *A Generic Solution to Polygon Clipping*, Communications of the ACM, 25, 1992, 58-63 for the Vatti algorithm, and Klamer Schutte, "An Edge Labeling Approach to Concave Polygon Clipping", url="citeseer.nj.nec.com/480676.html" for the Schutte algorithm). In the Weiler-Atherton algorithm, the polygons are described by a list of vertices and the algorithm includes the following steps:

a) determining the intersection of the subject polygon and the "clipper" polygon,
b) establishing lists of boundaries that lie inside and outside the "clipper" polygon,
c) creating an intersection vertex list for intersections where the subject polygon edge enters the "clipper" polygon and an intersection vertex list for intersections where the subject polygon edge leaves the "clipper" polygon, and
d) performing the actual clipping.

The algorithm is capable of being easily modified, by conventional means, to find the polygons outside of the clipping area such as polygons 170 and 180 in FIG. 4.

A first component of the figure of merit (FoM1) for the region of interest identification algorithm is the ratio of the clipped area 160 (overlap area) to the area of the "clipper" polygon 140 (area of the known region of interest). A second component of the figure of merit (FoM2) for the region of interest identification algorithm is the ratio of the outside area of the subject polygon 170 (difference between the area of the candidate region of interest and the overlap area) to the area of the "clipper" polygon 140 (area of the known region of interest). In one embodiment, in which both components are utilized in the figure of merit, the first component of the figure of merit (FoM1) approaches one (1) and the second component of the figure of merit (FoM2) approaches zero (0) as the limit of the best algorithm.

Once the figure of merit has been determined, it can be utilized to provide a measure of the fitness of the solution obtained by the genetic algorithm (see, for example, K. Rasheed, H. Hirsh, "Using Case Based Learning to Improve Genetic Algorithm Based Design Optimization", Proceedings of the Seventh International Conference on Genetic Algorithms (ICGA97), Morgan Kaufmann, San Francisco, Calif., 1997,url="citeseer.nj.nec.com/73094.html"). Also, the figure of merit can be utilized in the training of a neural network since it provides a measure of the error of the candidate neural network algorithm.

Figure 5:
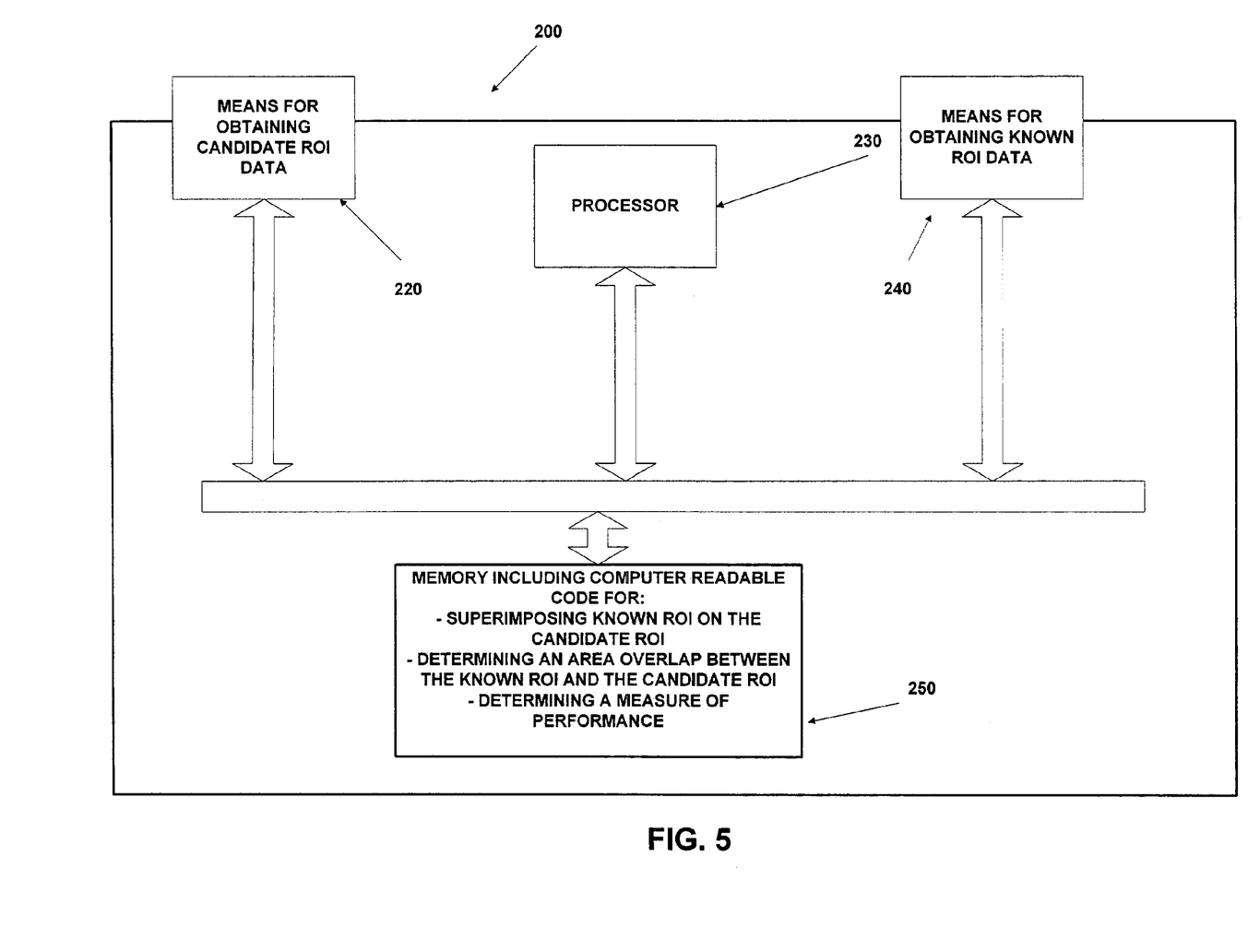
FIG. 5 depicts a block diagram representation of an embodiment of the system of this invention.

A block diagram representation of an embodiment of the system 200 that implements the method of this invention is shown in FIG. 5. The system of this invention 200 includes means 240 for obtaining known region of interest data, means 220 for obtaining candidate region of interest data from a candidate region of interest identified using the region of interest identification algorithm, one or more processors 230, one or more memories 250 having computer readable code embodied therein with instructions that cause the one or more processors 230 to superimpose the known region of interest on the candidate region of interest, determine an area overlap between the known region of interest and the candidate region of interest, and obtaining a measure of the performance (also referred to as a figure of merit) of the region of interest identification algorithm based on a the area overlap. After the known regions of interest have been identified by one of the methods described above and the known region of interest data generated (step 10, FIG. 1), the known region of interest data can be obtained by the system 200 from an input device such as, but not limited to, a keyboard, from a computer readable medium such as a floppy disk, a CD-R, a CD-RW, a writable DVD, a carrier wave, or a number of other examples of computer readable media. The known region of interest data can also be obtained by receiving the information from a memory in another or the same system.

The region of interest identification algorithm being analyzed or developed is utilized to identify candidate regions of interest (step 20, FIG. 1) and the data for the candidate regions of interest is generated (step 30, FIG. 1). The candidate region of interest data is then obtained by the system 200 from an input device such as, but not limited to, a keyboard, from a computer readable medium such as a floppy disk, a CD-R, a CD-RW, a writable DVD, a carrier wave, or a number of other examples of computer readable media or by receiving the information from a memory in another or the same system. It should be noted that the region of interest identification algorithm could reside in the one or more memories 250 as computer readable code that causes the one or more processors 230 to identify a candidate region of interest.

It should be noted that the region of interest identification algorithm could be the address block location algorithm in an address recognition system for mail pieces. It should also be noted that "mail piece" as used in this invention refers to any addressed object in a package or mail delivery system.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. Input device, as used herein, refers to any device, such as, but not limited to, a keyboard, a mouse, voice input, a touch sensitive pad or display, a computer pen, or a writing tablet, that is used to provide input data to provide data to programmable computer. The output information may be applied to one or more output devices.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method of obtaining a measure of performance for a region identification algorithm, the method comprising the steps of:
    identifying a reference region for a mail piece utilizing a method of predetermined accuracy;
    obtaining data for the reference region;
    identifying a candidate region for said mail piece using the region identification algorithm; the region identification algorithm being distinct from said method of predetermined accuracy;
    obtaining data for the candidate region;
    obtaining the measure of performance for the region identification algorithm from a relationship between the candidate region data and the reference region data.

2. The method of claim 1 wherein the step of obtaining the measure of performance further comprises the steps of:
    superimposing the reference region on the candidate region;
    determining an area overlap between the reference region and the candidate region utilizing the candidate region data and reference region data;
    obtaining the measure of performance from the area overlap.

3. The method of claim 1 further comprising the step of:
    utilizing the measure of performance in training of a neural network algorithm.

4. The method of claim 1 further comprising the step of:
    utilizing the measure of performance in improving a genetic algorithm.

5. The method of claim 2 wherein the step of determining an area overlap further comprises applying a polygon clipping algorithm to calculate the area overlap.

6. The method of claim 5 wherein the polygon clipping algorithm is selected from the group consisting of a Weiler-Atherton algorithm, a Sutherland-Hodgman algorirthm, a Liang-Barsky algorithm, a Vatti algorithm and a Shutte algorithm to calculate the area overlap.

7. The method of claim 2 wherein the step of obtaining said measure of performance further comprises the step of dividing the area overlap by an area of the reference region.

8. The method of claim 7 wherein the step of obtaining said measure of performance further comprises the step of dividing a difference between an area of the candidate region and the area overlap by the area of the reference region.

9. A system for providing a measure of the performance of a region identification algorithm, said system comprising:
    means for obtaining data for a reference region for a mail piece;
    means for obtaining data for a candidate region for said mail piece, said candidate region being identified using the region identification algorithm; the region identification algorithm being distinct from means for obtaining said reference region;
    at least one processor;
    at least one computer usable memory having computer readable code embodied therein, the computer readable code being capable of causing the at least one processor to:
    superimpose the reference region on the candidate region;
    determine an area overlap between the reference region and the candidate region, utilizing the candidate region data and reference region data; and,
    obtain a measure of the performance of the region identification algorithm from the area overlap.

10. The system of claim 9 wherein said computer readable code is further capable of causing said at least one processor to apply a polygon clipping algorithm to calculate the area overlap.

11. The system of claim 9 wherein the polygon clipping algorithm is selected from the group consisting of a Weiler-Atherton algorithm, a Sutherland-Hodgman algorithm, a Liang-Barsky algorithm, a Vatti algorithm and a Shutte algorithm.

12. The system of claim 9 wherein said computer readable code is further capable of causing said at least one processor to divide the area overlap by an area of the reference region.

13. The system of claim 12 wherein said computer readable code is further capable of causing said at least one processor to divide a difference between an area of the candidate region and the area overlap by an area of the reference region.

14. A method of obtaining a measure of performance for an address block location algorithm, the method comprising the steps of:
    obtaining location data for a reference address block for a mail piece;
    identifying a candidate address block for said mail piece using the address block location algorithm; said reference address block being obtained by a method distinct from the address block location algorithm;

obtaining location data for the candidate address block;

obtaining a measure of performance for the address block location algorithm from a relationship between the candidate address block location data and the reference address block location data.

15. The method of claim 14 wherein the step of obtaining a measure of performance further comprises the steps of:

superimposing the reference address block on the candidate address block;

determining an area overlap between the reference address block location and the candidate address block location, utilizing the candidate address block location data and reference address block location data;

obtaining a measure of performance based on the area overlap.

16. The method of claim 15 wherein the step of determining an area overlap further comprises applying a polygon clipping algorithm to determine the area overlap.

17. The method of claim 16 wherein the polygon clipping algorithm is selected from the group consisting of a Weiler-Atherton algorithm, a Sutherland-Hodgman algorithm, a Liang-Barsky algorithm, a Vatti algorithm and a Shutte algorithm.

18. The method of claim 15 wherein the step of obtaining the measure of performance further comprises dividing the area overlap by an area of the reference address block location.

19. The method of claim 18 wherein the step of obtaining the measure of performance further comprises dividing a difference between an area of the candidate address block location and the area overlap by an area of the reference address block location.

20. A system for providing a measure of performance for the performance of an address block location algorithm, the system comprising:

means for obtaining location data for a reference address block on a mail piece;

means for obtaining location data for a candidate address block on said mail piece, said candidate address block being identified using the address block location algorithm; said reference address block being obtained by a method distinct from the address block location algorithm;

at least one processor;

at least one computer usable memory having computer readable code embodied therein, said computer readable code being capable of causing at least one processor to:

superimpose the reference address block on the candidate address block;

determine an area overlap between the reference address block and the candidate address block, utilizing the candidate address block location data and reference address block location data;

obtain a measure of performance for the address block location algorithm front the area overlap.

21. The system of claim 20 wherein the computer readable code is further capable of causing the at least one processor to apply a polygon clipping algorithm to calculate the area overlap.

* * * * *